United States Patent [19]

Takahashi

[11] 4,165,154

[45] Aug. 21, 1979

[54] PROJECTION SCREEN ASSEMBLY

[75] Inventor: Yoshimasa Takahashi, Moriguchi, Japan

[73] Assignee: Sanyo Electric Co., Ltd., Osaka, Japan

[21] Appl. No.: 839,597

[22] Filed: Oct. 5, 1977

[30] Foreign Application Priority Data

Oct. 5, 1976 [JP] Japan .............................. 51-120504
Mar. 15, 1977 [JP] Japan ............................. 52-33138[U]

[51] Int. Cl.² ............................................. G03B 21/60
[52] U.S. Cl. ................................................... 350/128
[58] Field of Search ................................ 350/127, 128

[56] References Cited

U.S. PATENT DOCUMENTS 3,832,032   8/1974   Shimada ............................... 350/128

*Primary Examiner*—Richard A. Wintercorn
*Attorney, Agent, or Firm*—Armstrong, Nikaido, Marmelstein & Kubovcik

[57] ABSTRACT

The screen assembly includes a transparent plate which has one surface formed with lenticuler lens and the other surface matted, so as to diffuse light beams projected thereon and scatter in directions toward the surroundings of the screen assemby where the observers are situated, and not in directions upwards and downwards nor sidewards of the screen assembly.

8 Claims, 15 Drawing Figures

FIG. 1
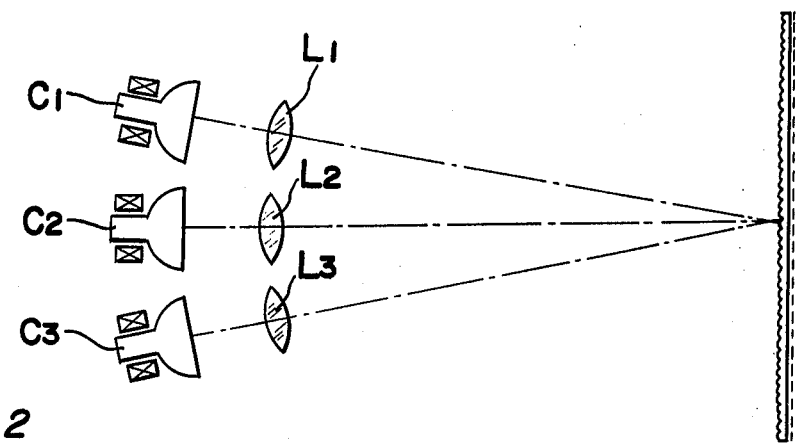
FIG. 2
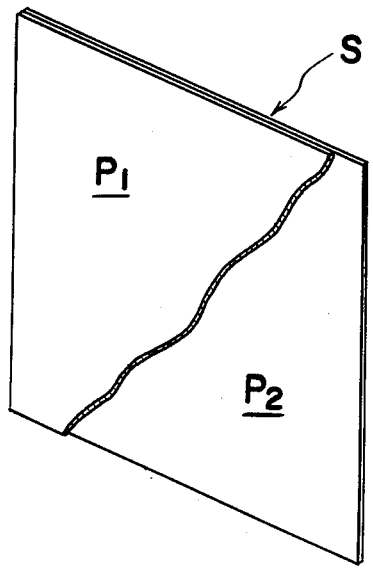
FIG. 5
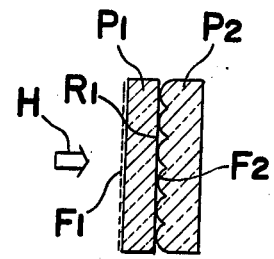
FIG. 6
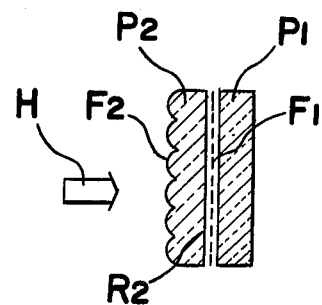
FIG. 3
FIG. 4
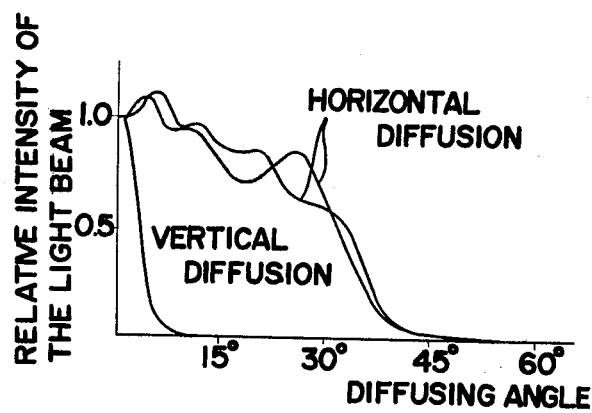

PROJECTION SCREEN ASSEMBLY

BACKGROUND OF THE INVENTION

The present invention relates to a screen assembly and, more particularly, to an improvement in translucent or transmissive screen assembly for use with a projection type television system or as a display panels.

Generally, a translucent or transmissive screen assembly is widely used with a projection type color television system of which the optical system is shown in FIG. 1.

Referring to FIG. 1 which shows the principle of the optical system, the projection type color television system has three cathode ray tubes $C_1$, $C_2$ and $C_3$ for projecting light beams of different primary colors which are normally red, green and blue, onto the transmissive screen S through lens assemblies $L_1$, $L_2$ and $L_3$, respectively. Three different color light beams must, when they are projected onto the projection screen, be mixed with each other, without any aberration, to form a proper color picture. The picture so formed on the screen is viewed by the observers who are situated at the right-hand side of the screen, that is, at one side of the screen opposite to the side of the tubes.

The screen of the above described type generally includes, as shown in FIG. 2, a diffuser plate member $P_1$ and a layer of lenticular member $P_2$. The diffuser plate member $P_1$ has at least one surface thereof mat-finished, so that the light beam passing through the diffuser plate member $P_1$ presents such a characteristics as shown in a graph of FIG. 3, in which the axes of abscissa and ordinate represent the diffusing angle and the relative intensity of the light beam, respectively. As apparent from the graph, the light beam passing through the plate member $P_1$ tend to be outwardly diffused at a great angle of diffusion relative to the direction of travel of such incoming light beam.

On the other hand, the lenticular lens member $P_2$ has at least one surface thereof formed with a plurality of parallel grooves, so that the light beam passing through the lenticular lens member $P_2$ presents such a characteristics as shown in a graph of FIG. 4 in which the axes of abscissa and ordinate represent the diffusing angle and the relative intensity of the light beam, respectively. As apparent from the graph, the light beam diffused by the lenticular lens member scatters mainly in one direction, such as a horizontal direction, and scarcely scatters in a vertical direction. In view of this, if the members $P_1$ and $P_2$ are combined, the result would be such that the diffused light beam transmitted through the projecting screen is directed mostly towards the surroundings of the screen where the observers are situated and not in directions upwards and downwards of the projecting screen.

According to the conventional screen assembly, the matted surface $F_1$ as shown in FIG. 5, of the diffuser plate member $P_1$ the grooved surface $F_2$ of the lenticular lens member $P_2$ are arranged to face a beam travelling in a direction as indicated by the arrow H, while these members $P_1$ and $P_2$ are bonded together with the opposite, rear surface $R_1$ of the diffuser plate member $P_1$ held in contact with the grooved surface $F_2$, or with the opposite rear surface $R_2$ held in contact with the matted face $F_1$ as shown in FIG. 6.

However, according to such conventional screen assembly, it has been found that, the larger the conventional screen is, the more the brightness of the image projected on such screen, which hereinafter referred to as screen gain GS, tends to be reduced. Therefore, the conventional screen assembly has a drawback in that the light beam passing therethrough tends to be diffused outwards at a great angle of diffusion relative to the surface of the screen, far from being directed towards the observers.

One reason for such reduction in the screen gain GS in the conventional screen assembly is due to an undesirable contact between the two layers. In the case where the lenticulared or grooved surface $F_2$ of the lenticular lens member $P_2$ is bonded to the rear surface $R_1$ of the diffuser plate member $P_1$ as shown in FIG. 5, an adhesive material fills up the grooves when the members $P_1$ and $P_2$ are clamped together during the manufacture of the screen assembly. Such adhesive material filling up the grooves constitutes a cause of light reflection at the boundary between the two layers and also reduction of the light transmissivity. Likewise, in the case where the matted surface $F_1$ is bonded to the rear surface $R_2$ of the lenticular lens member $P_2$, the adhesive material applied therebetween may undesirably fill up interstices in the matted surface, thus resulting in similar disadvantages.

SUMMARY OF THE INVENTION

Accordingly, a primary object of the present invention is to provide an improved screen assembly which has a high directivity with the increased screen gain GS to increase the brightness of the image projected on the screen assembly.

Another object of the present invention is to provide a screen assembly of the above described type which is simple in construction and can readily be manufactured at low cost.

In order to accomplish these and other objects, the screen assembly of the present invention has one surface thereof corrugated or lenticulated to define a plurality of elongated cylindrical lens elements adjoining with each other in parallel relation to each other and the other surface thereof matted for forming diffusing surface.

With such arrangement, the light beam passing through the lenticulated surface horizontally diffuses at a great angle of diffusion relative to the direction of travel of such incoming light beam, and the light beam passing through the matted surface diffuses at a small angle of diffusion, but equally in all directions, relative to the direction of travel of the incoming light beam. Accordingly, the diffused light beam transmitted through the projecting screen of the present invention is directed mostly towards the surrounding of the screen assembly, where the observers are situated, without an undesirable reduction in the screen gain GS.

BRIEF DESCRIPTION OF THE DRAWINGS

These and other objects and features of the present invention will become apparent from the following description taken in conjunction with preferred embodiments thereof with reference to the accompanying drawings, in which;

FIGS. 1 to 6 are drawings already referred to in the foregoing description, FIG. 1 being schematic view showing an optical arrangement of the conventional projection type color television system; FIG. 2 being a perspective view of a conventional screen assembly, with a portion broken away; FIGS. 3 and 4 being graphs showing diffusion of the screen shown in FIG. 2; FIG. 5 being fragmentary sectional view of the screen assembly shown in FIG. 2; and FIG. 6 being a view similar to FIG. 5, but showing a modification thereof;

DETAILED DESCRIPTION OF THE INVENTION

Figure 7:
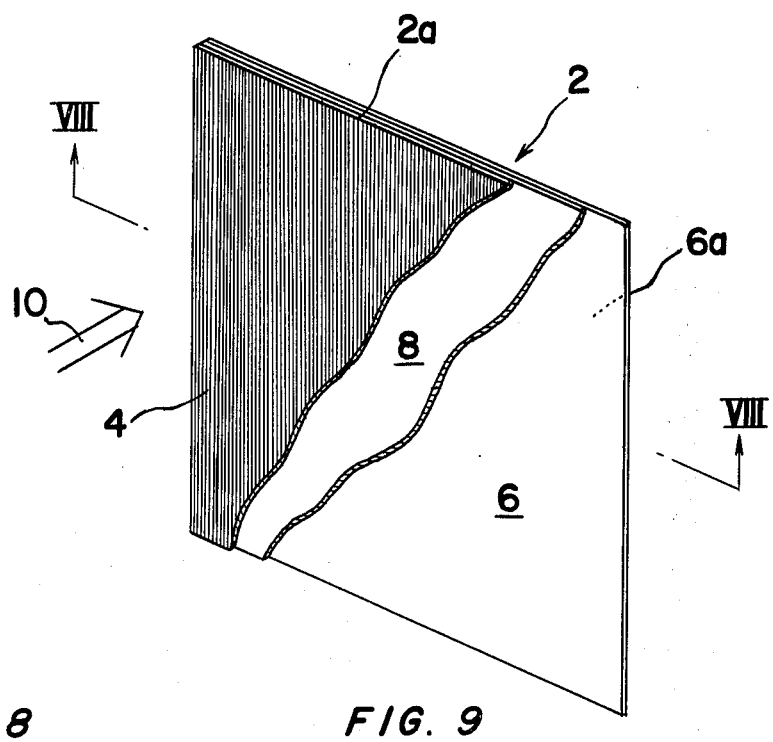
FIG. 7 is a perspective view of a screen assembly of the present invention, partly broken away to show the construction thereof.

Before the description of the present invention proceeds, it is to be noted that like parts are designated by like reference numerals throughout the accompanying drawings.

Figure 8:
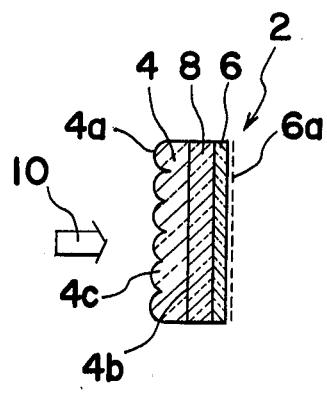
FIG. 8 is a fragmentary sectional view of the screen assembly shown in FIG. 7.

Referring first to FIGS. 7 and 8, a screen assembly 2 of the present invention comprises a lenticular lens 4, a diffuser plate 6 and a substratum 8. The lenticular lens 4 is, as best shown in FIG. 8, formed by a plate made of, for example, transparent polyvinyl-chloride having a thickness of 0.3 mm and having one surface 4a thereof corrugated, by the application of heat and pressure, to define a plurality of elongated cylindrical lens elements 4c adjoining in parallel relation to each other. Each adjacent two of these elements 4c are spaced a pitch of 0.254 mm from each other and each element 4c has a radius of curvature of 0.134 mm and a refractive index of 1.58. The other surface 4b of the lenticular lens 4 is polished to give a mirror-finish.

Accordingly, a bundle of light beams indicated by an arrow 10 projected on the lenticular lens 4 diffuses in a horizontal direction which is parallel to an upper edge 2a and in a vertical direction which is perpendicular to the upper edge 2a and parallel to the longitudinal axis of any one of the lens elements 4c. So far as the horizontal direction is involved, the light beam diffuses in a wide range which is determined by the lens pitch and the focal length, while, so far as the vertical direction is involved, the light beam diffuses in a narrow range or hardly diffuses.

The diffuser plate 6 is formed by a plate of, for example, trioxidized cellulose having a thickness of 0.117 mm and having one surface 6a thereof mat-finished in a known manner, the other surface 6b thereof being polished to give a mirror-finish. Accordingly, the light beams 10 passing through the diffuser plate 6 diffuse at a small angle of diffusion, but equally in all directions, relative to the direction of travel of such incoming light beams.

The substratum 8 is, for example, a thin plate made of transparent and rigid material such as acrylic resin and having opposite flat surfaces thereof being mirror-finished. Such substratum 8 serves as a reinforcement or support for maintaining a flatness of the resultant screen assembly 2 especially when the lenticular lens 4 and the diffuser plate 6 are so flexible as to be unable to keep the flatness of the resultant screen assembly 2. In other words, the application of such substratum 8 enables to employ the flexible and thin plate material for each of the lenticular lens 4 and diffuser plate 6.

While each of the components 2, 6 and 8 is constructed as hereinbefore described, they are bonded together, with the substratum 8 positioned between the lenticular lens 2 and the diffuser plate 6, by the use of a bonding agent, such as commercially available liquid bonding agent trademarked "Cemedine #3000" and sold by Cemedine Co., Ltd. of Japan. Specifically, in the embodiment shown in FIGS. 7 and 8, the lenticular lens 2 is bonded to the substratum 8 with the flat surface 4b held in contact with one of the opposed surface of the substratum 8, and the diffuser plate 6 is bonded to the same substratum 8 with the non-matted flat surface held in contact with the other of the opposite surfaces of the substratum 8. Care most be taken in applying the bonding agent and a pressure necessary to clamp the components 2, 6 and 8 together to avoid any possible formation of bubbles which may otherwise be present in between the adjoining surfaces of the components 2, 8 and 6.

Figure 13:
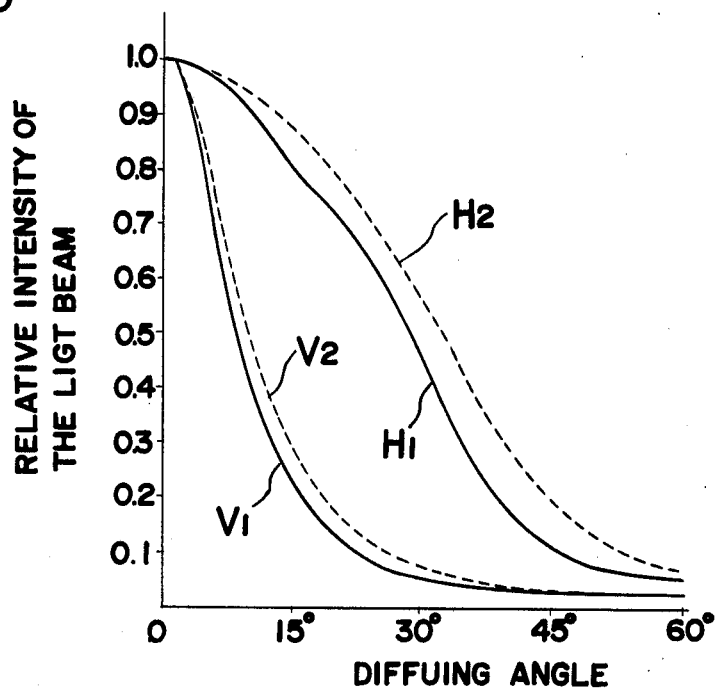
FIG. 13 is a graph showing diffusion characteristics of the screen assembly shown in FIG. 7.

The screen assembly 2 of the above described construction is, when in use, erected to render the lens elements 4c to extend in parallel relation to the vertical datum. While the assembly 2 is so erected and when a bundle of light beams 10 is projected onto the surface 4a of the screen assembly 2 of the present invention, the light beams penetrate through the screen assembly 2 and scatter towards the surroundings of the screen assembly 10 where the observers are situated, and not in directions upwards and downwards nor sidewards of the projecting screen assembly 2. The relation between the scattering direction of the light beams and the relative intensity of the light beams is given in a graph of FIG. 13, in which the axes of abscissa and ordinate represent diffusing angle and relative intensity of the light beams, respectively. The curves shown by the solid line and indicated by reference characters $H_1$ and $V_1$ represent horizontal and vertical diffusion characteristics of the screen assembly 2 of the present invention, respectively, while the curves shown by the broken line and indicated by reference characters $H_2$ and $V_2$ represent horizontal and vertical diffusion characteristics of the conventional screen assembly, respectively. As can be understood from the graph, the light beams passing through the screen assembly 2 of the present invention are not so widely diffused as in the light beams past the screen assembly of the above described conventional type.

Since the contact of the three components 2, 8 and 6 is effected between the mirror-finished surfaces of the adjoining components, neither the lenticulared surface nor the matted surface is likely to be deteriorated by the bonding agent. Furthermore, the bondability between the adjoining components can be maintained high and the light beams passing therethrough will not undesirably be scattered because of the air tight contact therebetween. Accordingly, it is found by the present inventors that the screen gain GS of the screen assembly 2 of the present invention shows a value of 6.7 which is superior to the conventional type having a screen gain of 6.0.

Figure 9:
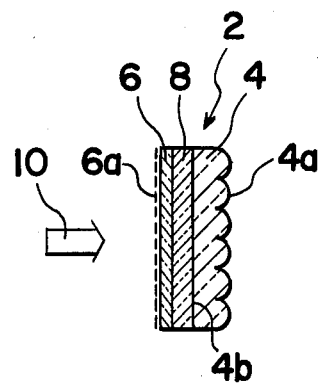
FIGS. 9 and 10 are views similar to FIG. 8, but showing modifications thereof.

It is to be noted that the screen assembly 2 described as positioned in such as to receive the light beams on the lenticulated surface 4a may be reversed in position, as shown in FIG. 9, so as to receive the light beams on the matted surface 6a of the diffuser plate 6.

Figure 10:
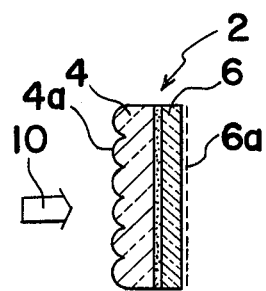

It is also to be noted that the substratum 8 described as provided between the lenticular lens 4 and diffuser plate 6 may not be always necessary and, therefore, omitted, as shown in FIG. 10, to have the respective mirror-finished faces of the lenticular lens 4 and the diffuser plate 6 bonded to each other, if at least one of the lens 4 and plate 6 is made of a rigid material.

Figure 11:
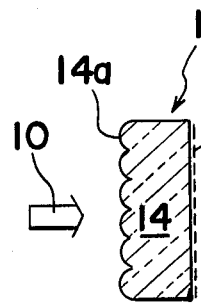
FIGS. 11 and 12 are views similar to FIG. 8, but showing further embodiments thereof.

Referring to FIG. 11, there is shown a fragmentary sectional view of a screen assembly 12 according to another embodiment of the present invention. The screen assembly 12 in this embodiment is formed by a solid plate 14, which is transparent and comparatively hard, such as acrylic resin. One surface 14a of the plate 14, which is adapted to receive the light beams, is lenticulated to define a plurality of parallel and elongated cylindrical lens elements, while the other surface 14b of the plate 14 is matted or mat-finished.

Figure 12:
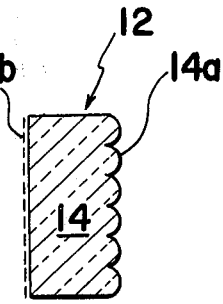

It is to be noted that the screen assembly 12 described as positioned in such as to receive the light beams on the lenticulated surface 14a may be reversed in position, as shown in FIG. 12, so as to receive the light beams on the matted surface 14b of the plate 14.

It is also to be noted that the solid plate 14 described as made of acrylic resin can be made of any other material such as polyvinyl-chloride which is comparatively rigid, transparent and readily workable.

The screen assembly 12 of the present invention, particularly suitable for use with the projection type color television system, may be manufactured in the following manner.

First, a material for the plate 14 is selected, and the refractive index of the material is naturally fixed and the thickness thereof is determined depending on the optimum strength of the screen of a particular size. Since the focal length f of the lenticular lens can be determined by the thickness of the screen, the curvature of any one of the lens elements is determined by an equation $f=2r$, in which r is a radius of the curvature. The pitch a between each adjacent two lens elements in the lenticular lens can be so selected that the plate 14 should not totally reflect the parallel incident light beams projected thereon and diffuses the rays of light, passing therethrough, at an angle of diffusion of about 30°. However, when the screen is considered as a spatial filter, it must be taken into consideration that the pitch a so selected should be of such a value as to ensure the response value of the screen within a spatial frequency range of the video signal. In other words, when the screen is considered as a spatial filter, assuming that diffusion of the focal point of the lenticular lens is infinitesimal and that the video signal projected on the screen is fluctuating, then the response value of the screen varies with respect to the variation of the video signal. When positive and negative peak values of the video signal appearing at one sampling point which is on the focal point are detected to have response values of Hmax and Hmin, respectively, provided that the lens pitch is a, then, the obtained optical transfer function, referred to as OTF hereinbelow, can be expressed as H1max and H1min, respectively. When such sampling point which is on the focal point is assumed to be diffused by an amount expressed by a function h(t), caused by the effect of isotropic beam diffusion at the matted-surface of the screen and aberration of the lens, then the OTF for this diffused sampling point can be expressed as;

$$H2(\omega) = \int_{-\infty}^{\infty} h(t) \cdot \exp(-i\omega t) \cdot dt$$

Accordingly, the OTF for the entire lens can be expressed as;
$H=H1min \cdot H2$ or $H=H1max \cdot H2$.

When such relation ($H=H1min \cdot H2$) is satisfied with all the properties in the video signal, then it is ensured that the image signal is within the spatial frequency properties. Thus, the lenticular lens with the lens elements spaced the pitch a from each other will provide a sharp image on the screen.

The description hereinbelow is directed to an improved projection type color television system with which the screen arrangement of the present invention can be used. The projection type color television system is fully described in U.S. patent application Ser. No. 749,281 filed on Dec. 10, 1976 and assigned to the same assignee, however, the description hereinbelow is particularly directed to an optical arrangement therefor in connection with the screen assembly of the present invention.

Figure 14:
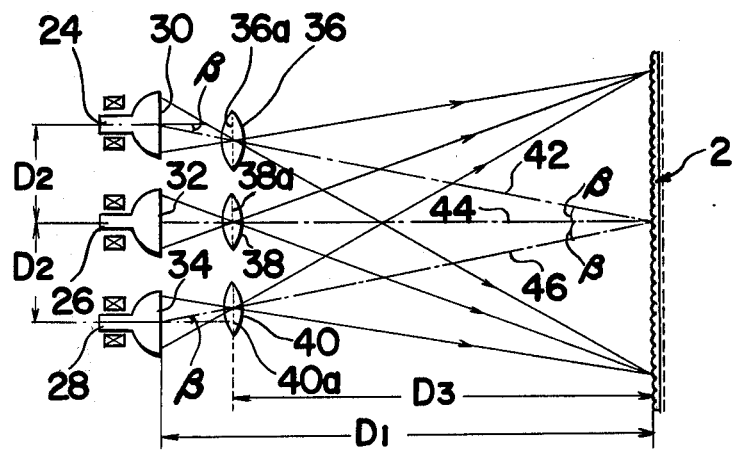
FIG. 14 is a schematic view showing an optical arrangement of the improved projection type color television system.

Referring to FIG. 14, the optical arrangement for the projection type color television system includes three cathode ray tubes 24, 26, 28 each having glass faceplate or phosphor screen 30, 32 or 34 adapted to project onto the screen assembly 2 one of three primary color light beams containing image information. For example, the three cathode ray tubes 24, 26 and 28 may produce color light beams of red, green and blue, respectively. The three cathode ray tubes 24, 26 and 28 are provided in such a manner that their glass faceplates or phosphor screens 30, 32 and 34 are positioned in parallel relation to the face of the screen assembly 2 and spaced a predetermined distance $D_1$ from the face of the screen assembly 2 and that the neighboring cathode ray tubes are spaced a distance $D_2$ from each other and the phosphor screens are positioned in alignment with an imaginary line parallel to the horizontal scanning direction of the light beam.

It should be noted that the optical axis for the light beam projected from each of the cathode ray tubes coincides with a line extending between the center of the corresponding phosphor screen and the center of the screen assembly 2. Therefore, broken lines designated by the reference numerals 42, 44 and 46 represent optical axes for the light beams projected from the cathode ray tubes 24, 26 and 28, respectively.

The three lens assemblies 36, 38 and 40, each represented by a single lens for the sake of brevity, are provided in such a manner that their principle planes designated by reference numerals 36a, 38a and 40a, are positioned in parallel relation to the face of the screen assembly 2 and are spaced a predetermined distance $D_3$ from the face of the screen assembly 2.

It is needless to say that the centers of the lens assemblies 36, 38 and 40 coincide with the optical axes 42, 44 and 46, respectively.

With such optical arrangements described above, wherein the lens characteristics of the lens assemblies 36, 38 and 40 are alike each other, the image in different colors are enlarged in equal magnification, so that the projected image of each color light beam geometrically matches with the images of other color light beams. Thus, if the aberration of the lens assemblies 36, 38 and 40 is neglected, the images in three different colors projected on the screen assembly 2 are properly superimposed one over the other to reproduce a true color picture having neither disadvantageous geometrical displacement nor blur.

Accordingly, in such optical arrangement, the allowances for the distance $D_1$ and $D_2$ can be ranged to a larger extent than the conventional optical arrangement, since the distance change in either of the distances $D_1$ and $D_2$ may not affect the geometrical displacement between the projected images in different colors.

Furthermore, since the three planes, first plane including the phosphor screens of the three cathode ray tubes, second plane including principal planes of the lens assemblies and third plane including the screen assembly face, are in parallel relation to each other, the proper focusing planes for the different color light beams projected form the three cathode ray tubes coincide with each other on the third plane including the projecting screen face. Therefore, in the optical arrangement shown in FIG. 14, the lens assemblies having the relative aperture in comparatively high range are available. According to the test carried out by the inventors, the lens assemblies applied in the projection type color television system were able to accommodate as bright as f/stop of 2.0, whereas those applied in the conventional optical arrangement were able to accommodate f/stop 2.8, in reproducing the same true color picture perceived with the eyes, under the conditions in which the magnification of the lens assemblies being six and diagonal distance of the screen being 750 m/m with the same projecting distance.

Therefore, the brightness of the projected color picture on the screen assembly 2 with the optical arrangement in the television system is twice as bright as those in the conventional type.

As is apparent from the foregoings, the optical arrangement shown in FIG. 14 is superior to that shown in FIG. 1 from the view point of brightness, i.e., luminance. However, the optical arrangement of the television system may have a problem in an irregularity in the established color picture projected on the screen when the three color images are to be mixed.

The description is now had to such problem and to means for correcting the problem.

Still referring to FIG. 14, the optical axis 42 for the light beam projected from the cathode ray tube 24 is inclined by an angle of $\beta$ from the optical axis 44. Likewise, the optical axis 46 is inclined toward the other side by an angle of $\beta$ from the optical axis 44. Hence, the light beams projected from the cathode ray tubes 24 and 28 and gathered by the respective lens assemblies 36 and 40 are inclined by the angle of $\beta$ from the axes of respective cathode ray tubes 24 and 28.

Figure 15:
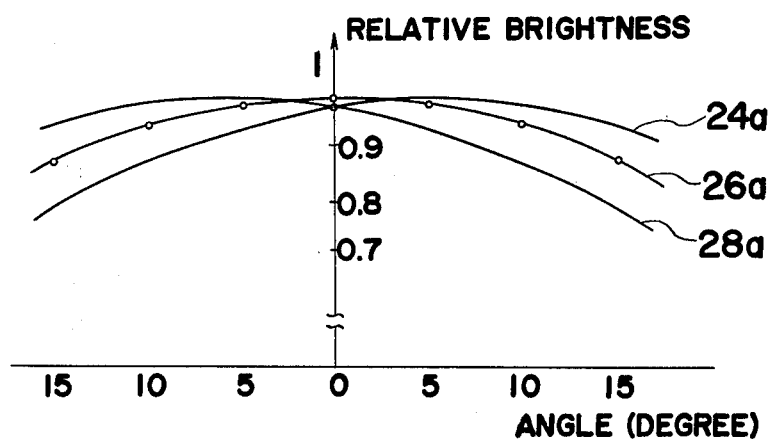
FIG. 15 is a graph showing a relative brightness of the three different primary color projected onto the screen before being corrected.

Suppose that the image on the phosphor screen of each cathode ray tube has uniform brightness and perfectly been diffused, and that each lens assembly has the relative aperture of unity and has equal spectral transmittance for the three colors. Under such condition, the brightness of the image on the screen assembly 2 becomes deflected in such a manner to decrease the brightness as the image depart from the axis of each lens assembly. Upon defining the brightness of the image projected form the cathode ray tube 26 on the screen assembly 2 at the center thereof as unity, the relative brightness of the image on the screen 2 is equal to $\cos^4\theta$, wherein $\theta$ is an angle of light beam emitted from the lens assembly. Such relation is known as cosine of the fourth power of the angle. Accordingly, the relative brightness of the image on the screen assembly 2 without brightness correction is given in a graph shown in FIG. 15, in which the axis of abscissa represents emission or projection angle and the axis of ordinate represents relative brightness. The curves given by the reference numerals 24a, 26a and 28a show the relative brightness of the images projected from the cathode ray tubes 24, 26 and 28, respectively on the screen assembly 2, provided that the $\beta$ is 5.5°. Such deflection in the brightness can be corrected through a suitable correction in a signal applied to each of the cathode ray tubes.

With such optical arrangement employed in the projection type color television system, the screen assembly 2 of the present invention contributes in such a manner that the range for the light beam diffused in a horizontal direction is mainly determined by the lenticular lens 4 and that the range for the light beam diffused in a vertical direction is mainly determined by the diffuser plate 6. Since the viewing angle for an observer to watch television may range, for example, ±30° in the horizontal direction and ±15° in the vertical direction from the center of the screen, the screen assembly 2 of the present invention is so arranged as to diffuse the light beam at a wide angle in the horizontal direction and to diffuse the light beam at a narrow angle in the vertical direction. Thus, the diffused light beam mainly directs towards observers who are around the projecting screen 2.

It should be noted that the projecting screen 2 of the present invention may be formed in a reflective type screen.

It should also be noted that the diffuser plate 6 described as made of trioxidized cellulose may be replaced by a ground glass for use in building materials.

Although the present invention has been fully described by way of examples with reference to the accompanying drawings, it is to be noted that various changes and modifications are apparent to those skilled in the art. Therefore, unless such changes and modifications depart from the scope of the present invention, they should be construed as included therein.

What is claimed is:

1. A screen assembly for projecting thereon light beam emitted from a source of light carrying an image, so as to form the image thereof, which comprises:
    a transparent plate having on one side thereof a lenticulated surface means comprising a plurality of elongated cylindrical lens elements extending in a parallel relation to each other and on the other side thereof a mat-finished surface means, wherein said lenticulated surface means diffuses the incoming light in a horizontal direction which is perpendicular to the elongated cylindrical lens elements, and said mat-finished surface means diffuses the incoming light in all directions, relative to the direction of travel of the incoming light, whereby the light projected on the screen assembly diffuses at a first predetermined angle of diffusion which is small relative to the direction of the longitudinal axis of any one of said elongated cylindrical lens elements and at a second predetermined angle of diffusion which is great relative to the direction perpendicular to the longitudinal axis of any one of said elongated cylindrical lens elements.

2. A screen assembly as claimed in claim 1, wherein said plate is made of acrylic resin.

3. A screen assembly as claimed in claim 1, wherein said plate is made of polyvinyl-chloride.

4. A screen assembly as claimed in claim 1, wherein said first and second predetermined angles are ±15° and ±30°, respectively.

5. A screen assembly as claimed in claim 1, wherein said light beams are projected onto said lenticulated surface means.

6. A screen assembly as claimed in claim 1, wherein said light beams are projected onto said mat-finished surface means.

7. A screen assembly as claimed in claim 1, wherein said plate comprises a first layer having one surface thereof formed with the lens elements and other surface thereof polished to give a mirror-finish, second layer made of rigid material and having opposite flat surfaces thereof being mirror-finished, and a third layer having one surface thereof mat-finished and the other surface thereof polished to give a mirror-finish, said first, second and third layers being bonded together with said second layer positioned between the first and second layers in such a manner that the first layer is bonded to the second layer with the mirror-finished surface of the first layer held in contact with one of the opposite mirror-finished surface of the second layer and that the third layer is bonded to the second layer with the mirror-finished surface of the third layer held in contact with other of the opposite mirror-finished surface of the second layer.

8. A screen assembly as claimed in claim 1, wherein said plate comprises a first layer having one surface thereof formed with the lens elements and the other surface thereof polished to give a mirror-finish, and a second layer having one surface thereof mat-finished and the other surface thereof polished to give a mirror-finish, said first and second layers being bonded together with each other in such a manner that the first layer is bonded to the second layer with the mirror-finished surface of the first layer held in contact with the mirror-finished surface of the second layer.

* * * * *